US009886182B1

(12) United States Patent
Minks-Brown et al.

(10) Patent No.: US 9,886,182 B1
(45) Date of Patent: Feb. 6, 2018

(54) INTEGRATION OF IMAGE-SIFTING WITH LOCK-SCREEN INTERFACE

(71) Applicant: Sprint Spectrum L.P., Overland Park, KS (US)

(72) Inventors: Christa Minks-Brown, Olathe, KS (US); Jason Rincker, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 849 days.

(21) Appl. No.: 14/263,482

(22) Filed: Apr. 28, 2014

(51) Int. Cl.
  G06F 3/048 (2013.01)
  G06F 3/0486 (2013.01)
  G06F 3/0488 (2013.01)
  G06F 3/0481 (2013.01)
  G06F 17/30 (2006.01)

(52) U.S. Cl.
  CPC .......... *G06F 3/0486* (2013.01); *G06F 3/0488* (2013.01); *G06F 3/04817* (2013.01); *G06F 17/3028* (2013.01)

(58) Field of Classification Search
  None
  See application file for complete search history.

(56) References Cited

U.S. PATENT DOCUMENTS

| 7,765,245 B2 | 7/2010 | Nichols et al. | |
| 2004/0049533 A1 | 3/2004 | Knight | |
| 2004/0215643 A1* | 10/2004 | Brechner | G06F 17/30017 |
| 2005/0192924 A1 | 9/2005 | Drucker et al. | |
| 2007/0150842 A1 | 6/2007 | Chaudhri et al. | |
| 2009/0064044 A1* | 3/2009 | Pyhalammi | G06F 17/30274 715/825 |
| 2009/0259968 A1* | 10/2009 | Hsieh | H04M 1/677 715/808 |
| 2010/0248689 A1* | 9/2010 | Teng | H04M 1/67 455/411 |
| 2011/0187727 A1 | 8/2011 | Ahn et al. | |
| 2012/0084734 A1 | 4/2012 | Wilairat | |
| 2012/0115438 A1 | 5/2012 | Umealu | |
| 2012/0284297 A1 | 11/2012 | Aguera-Arcas et al. | |

(Continued)

OTHER PUBLICATIONS

Mashable, "Interactive Digital Frame Lets Grandma Respond to Emailed Pics [REVIEW]," http://mashable.com/2011/04/24/kodak-pulse/#_, printed from the World Wide web on Apr. 18, 2014.

*Primary Examiner* — William Trapanese

(57) ABSTRACT

Disclosed is a method and apparatus in which a computing device is configured to present as part of its lock-screen interface an image selected from a user's digital image library, and to receive user input designating a classification of the presented image and respond to that user input by not only recording a classification of the image but also unlocking the device. Further, each time the computing device again presents its lock-screen interface, the computing device may present a next image from the user's image library, thereby allowing the user to concurrently classify that next image as well while unlocking the device. Consequently, as a user repeatedly interacts with the lock-screen interface over time, the user may not only enjoy seeing various images from the user's image library but may also conveniently classify those images as an integral part of the user's repeated unlocking of the device.

20 Claims, 4 Drawing Sheets

(56) References Cited

U.S. PATENT DOCUMENTS

| | | |
|---|---|---|
| 2012/0314916 A1 | 12/2012 | Rothschild |
| 2013/0069962 A1* | 3/2013 | Nealer ............... H04M 1/72563 |
| | | 345/522 |
| 2013/0111408 A1* | 5/2013 | Berus ................ G06F 17/30873 |
| | | 715/835 |
| 2013/0283199 A1 | 10/2013 | Selig et al. |
| 2014/0019253 A1 | 1/2014 | Ricasata |
| 2014/0298260 A1* | 10/2014 | Abowd ............... G06F 3/04842 |
| | | 715/810 |
| 2014/0323121 A1* | 10/2014 | Kim .................. H04M 1/72561 |
| | | 455/419 |

\* cited by examiner

INTEGRATION OF IMAGE-SIFTING WITH LOCK-SCREEN INTERFACE

BACKGROUND

Unless otherwise indicated herein, the materials described in this section are not prior art to the claims and are not admitted to be prior art by inclusion in this section.

Modern handheld devices such as smart phones typically include lock-screen functionality designed to prevent accidental touch-screen interaction. In particular, every time the display of such a device is turned on, the device may present on the display a lock-screen interface that generally requires a user to take some specified, intentional action in order to get past the lock-screen interface and to thereby access other features of the device. By way of example, a representative lock-screen interface may require a user to swipe on the display in a particular manner, such as along a displayed slider object, and/or to enter a password or passcode. Once the user takes the required action, the device may then proceed to present another interface, such as a main desktop interface, a last-used application interface, or perhaps a further authorization interface.

In practice, a user of such a handheld device may turn on the display numerous times every day, to check the device for new e-mail, text messages, social network updates, weather updates, stock updates, or the like, and may thus repeatedly encounter the lock-screen interface. Further, each time the user finishes using the device, the user may then turn off the display, or the device may automatically turn off the display after a period of non-use, to help conserve battery power. In turn, every time the user again turns on the display, the user may again encounter the lock-screen interface. Thus, numerous times every day, a user may interact with the lock-screen interface to unlock the device.

Moreover, as a currently unrelated matter, with the widespread growth of digital photography, it has become common for users to accumulate massive libraries of digital images. Further, given the convenience of capturing and storing digital images, users often add such images to their libraries without taking the time or effort to categorize the images. As a result, when it becomes necessary to find images of interest, a user may be faced with the difficult and unenviable task of having to review their entire image library in search of the desired images.

OVERVIEW

Disclosed herein is a method and apparatus for integrating lock-screen functionality with digital image classification. In accordance with the disclosure, a computing device such as a smart phone may be configured to present as part of its lock-screen interface an image selected from a user's digital image library, and to then receive user input designating a classification of the currently presented image and respond to that user input by not only recording a classification of the image but also unlocking the device. Thus, the disclosed method and apparatus conveniently provides for image classification as an integral part of the process of unlocking the computing device.

Further, each time the computing device presents its lock-screen interface, the computing device may advantageously present a next image selected from the user's digital image library, receive user input designating a classification of that next image, and responsively both record a classification of that next image and unlock the device. Consequently, as a user repeatedly interacts with the lock-screen interface over time, the user may not only enjoy seeing various images selected from the user's digital image library but may also conveniently cause the computing device to classify those images as an integral part of the user's repeated unlocking of the device.

Accordingly, in one respect, disclosed is a method operable by a computing device. In an example implementation, the method involves displaying an image on a lock screen of a computing device when the computing device is in a locked state, the image being rendered from a digital image file. Further, the example method involves the computing device detecting user input to the computing device while the image is being displayed on the lock screen. And the example method then involves, responsive to detecting the user input while the image is being displayed on the lock screen, (i) the computing device transitioning from the locked state to an unlocked state and (ii) the computing device classifying the digital image file in accordance with the user input, such as by moving the digital image file to a corresponding folder and/or meta-tagging the digital image file with corresponding meta-data.

Further, in another respect, disclosed is a computing device including a touch-sensitive display and user-accessible data storage, the computing device having a display-off state in which the touch-sensitive display is powered off and a display-on state in which the touch-sensitive display is powered on. In an example implementation, when such a computing device transitions from the display-off state to the display-on state, the computing device enters into a locked state in which the computing device presents on the touch-sensitive display a lock-screen interface that includes an image rendered by the computing device from a digital image file selected from a plurality of digital image files. Further, while the lock-screen interface is thereby being presented, the computing device detects at the touch-sensitive display a gesture input indicating a classification of the image and, in response to the gesture input, the computing device (i) transitions from the locked state to an unlocked state and (ii) moves the selected digital image file to a storage location corresponding with the indicated classification of the image.

Still further, in another respect, disclosed is a non-transitory computer readable medium having stored thereon program instructions executable by a processing unit to cause a computing device to carry out various functions. In an example implementation, the functions include displaying an image on a lock screen of the computing device when the computing device is in a locked state, the image being rendered from a digital image file. Further, the example functions include detecting a user input to the computing device while the image is being displayed on the lock screen. And the example functions include, responsive to the detecting of the user input while the image is being displayed on the lock screen, (i) transitioning the computing device from the locked state to an unlocked state and (ii) classifying the digital image file in accordance with the user input.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only and that many variations are possible.

DETAILED DESCRIPTION

The present disclosure will focus by way of example on implementation with respect to a handheld smart phone having a touch-sensitive display screen. However, it will be understood that principles of the disclosure can apply as well with respect to numerous other types of computing devices, including for instance tablet computers, gaming devices, media players, cameras, navigation devices, medical devices, head-mounted displays, smart watches, and other devices now known or later developed.

Figure 1:
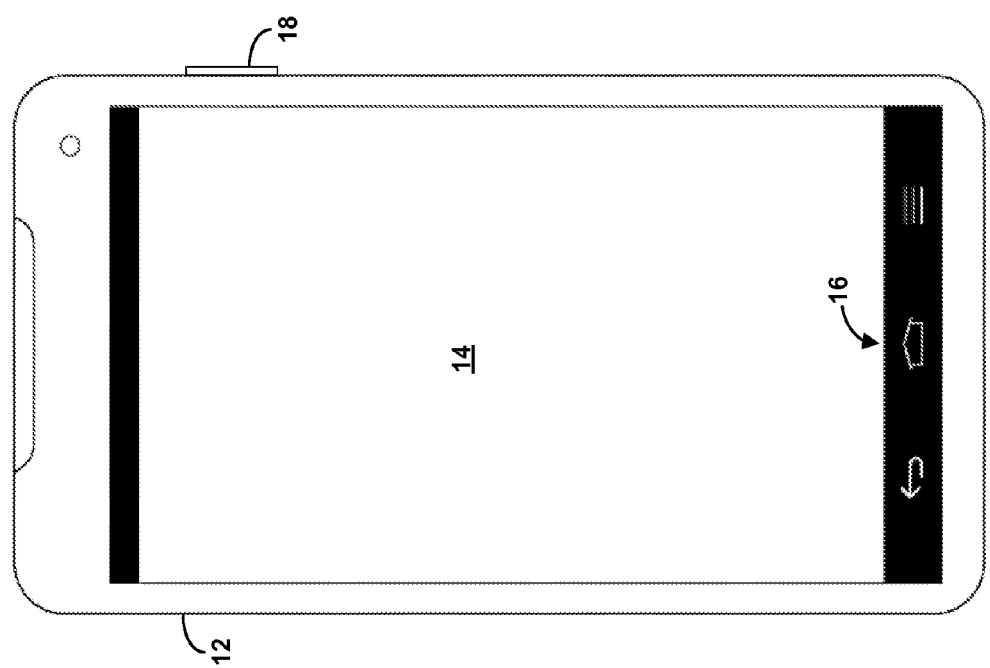
FIG. 1 is a front view of an example handheld smart phone.

Referring to the drawings, as noted above, FIG. 1 is a front view of an example handheld smart phone 12. As shown in the figure, the phone includes a display 14 that occupies a large portion of the front surface and is arranged to present visual information such as graphical user interfaces and other content. In a representative implementation, the display is a touch-sensitive display that is configured to sense a user's touch at various positions and to provide control output indicating the position of the touch on the display, so as to enable the phone to take corresponding action such as registering a key press, activating particular application logic, or changing the position of graphically displayed objects. Such a touch-sensitive display may employ any of a variety of mechanisms to sense touch and provide a corresponding output. For instance, the display may employ resistive sensors, capacitive sensors, and/or surface acoustic wave sensors.

In practice, the phone may have a display-on state in which the display 14 is powered on and presents visual information, and a display-off state in which the display is powered off and therefore does not present any visual information. Further, the phone may include one or more mechanisms to facilitate transition between these states. For instance, the phone may include a button 16, such as a home button, at the lower portion of the front surface that a user can press to turn on the display, and the phone may include another button 18 on a side surface that a user can press to turn on or off the display. In addition, the phone may be arranged to automatically power off the display in response to a period of inactivity. Moreover, the phone may automatically power on the display in response to certain triggering events, such as receipt of incoming text messages for instance.

Note that these states of the display are distinct from power states of the phone itself. When the phone is fully powered off, the display would of course also be powered off and thus the phone would be in the display-off state. But when the phone is powered on, the display may at times be powered on and at other times be powered off. For instance, each time a user seeks to interact with the phone after a period of inactivity, the user may press button 16 or button 18 to turn on the display, and each time the user finishes interacting with the device, the user may press button 18 to turn off the display or the device may automatically turn off the display after a period of inactivity.

As discussed above, such a phone may include lock-screen functionality to help prevent accidental user interaction with the touch-screen. In particular, each time the display transitions to the display-on state, the phone may enter into a locked state in which the phone generally does not allow access to certain functions unless and until a user takes some predefined action designed to signify the user's intent to access the phone. As noted above, an example of the required user action is a specific gesture on the touch-sensitive display, such as swiping on the display along a slider object for instance.

Figure 2:
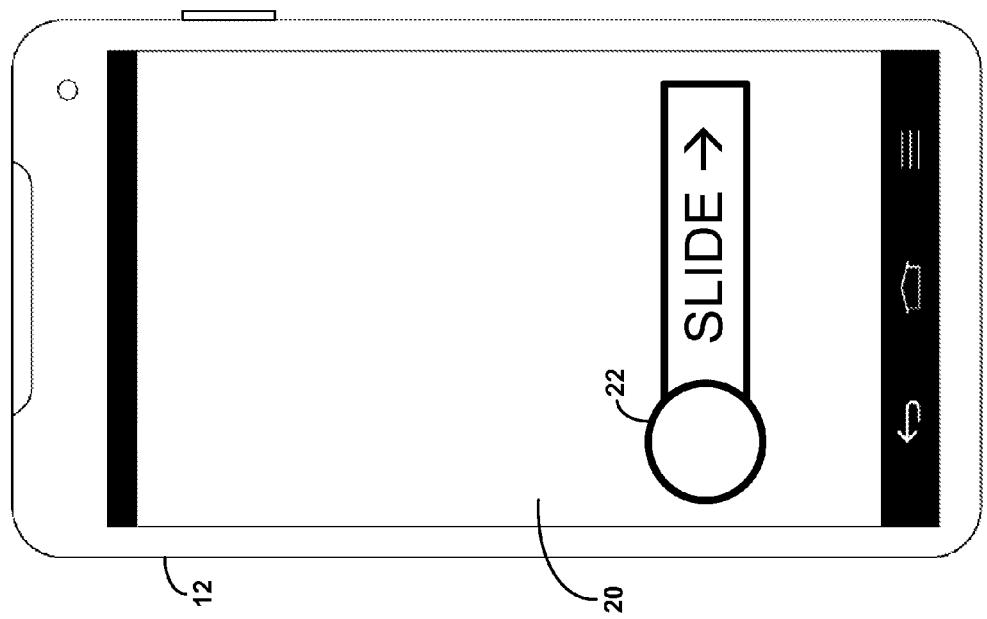
FIG. 2 is an illustration of a typical lock-screen interface.

FIG. 2 depicts an example of such a basic lock-screen interface (lock screen) 20 that a phone might present on display 14 in response to the phone transitioning to a display-on state, or for that matter in response to another trigger (such as the phone detecting interruption of an ongoing screen saver presentation for instance). As shown, the lock-screen interface includes a slider object 22 with an arrow instructing the user to swipe along the slider object in the designated direction. Unless and until the user swipes on the display in that manner the lock-screen interface may remain in place, or the phone may transition to a display-off state, essentially remaining in the locked state. However, once the user swipes on the display in the designated manner, the phone may responsively transition out of the locked state and may present a next interface on the display. Depending on the implementation, the next interface that the phone presents at that point could take various forms, examples of which include a desktop screen with icons representing various applications selectable by a user, an interface of a last-used application, or perhaps a passcode entry screen requiring user entry of a passcode to facilitate accessing further functions of the device.

Figure 3:
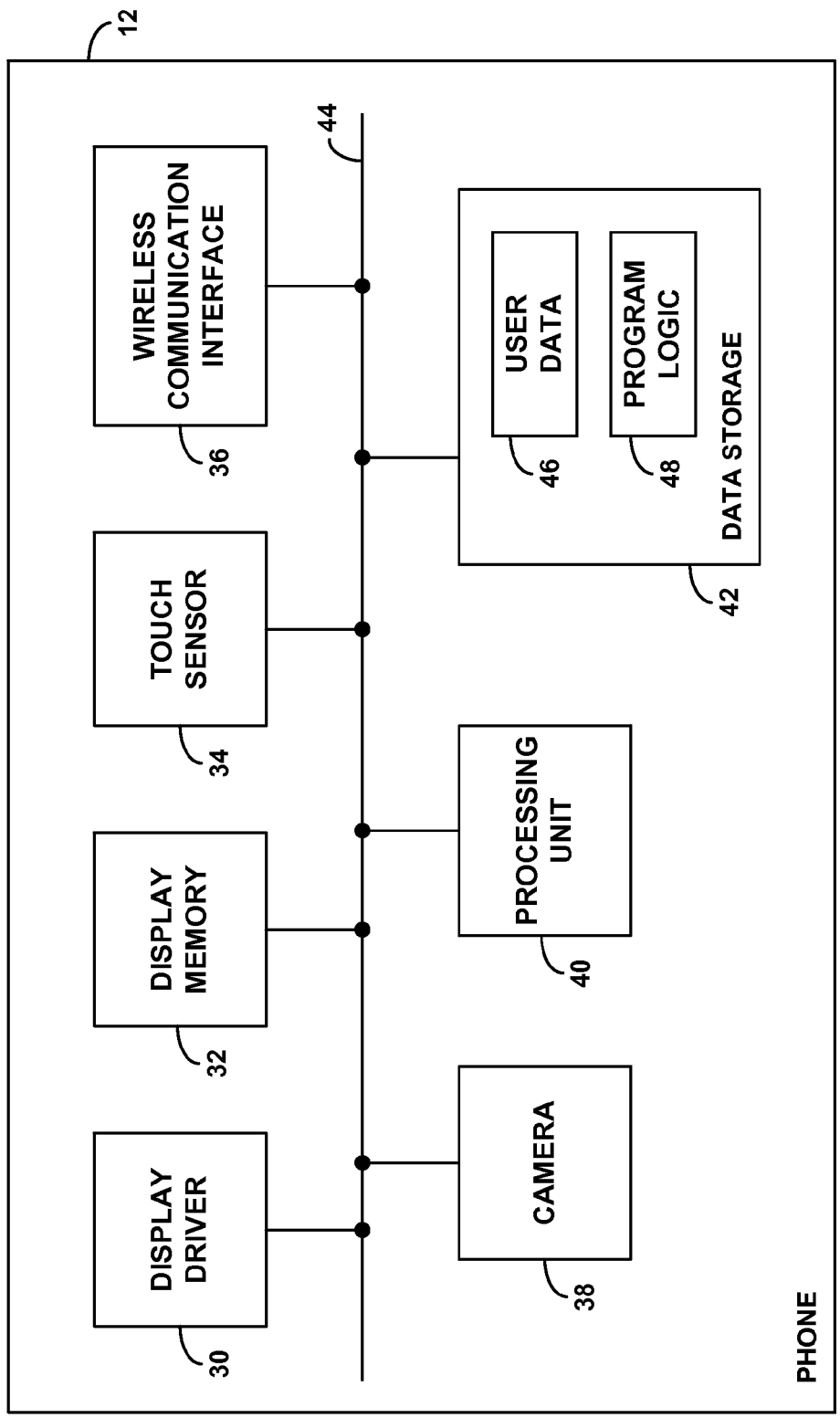
FIG. 3 is a simplified block diagram depicting components of an example phone.

FIG. 3 is next a simplified block diagram showing certain additional components of the example phone. As shown, the components include a display driver 30, display memory 32, a touch sensor 34, a wireless communication interface 36, a camera 38, a processing unit 40, and data storage 42, all of which may be coupled together by a system bus or other connection mechanism 44. Although these components are shown as discrete blocks, in practice various components could be integrated together with each other.

In practice, the display driver 30 may be a microcontroller that functions as an interface to control output of visual information for presentation on the display 14, the display memory 32 may comprise memory for storing data representing visual information for output on the display, and the touch sensor 34 may comprise a touch-sensitive surface integrated with the display to provide output indicating position of touch on the display. Further, the wireless communication interface 36 may comprise an antenna structure and transceiver enabling the phone to communicate with various other devices or systems on a personal area network, local area network, and/or wide area network, according to a protocol such as WIFI, BLUETOOTH, LTE, CDMA, or GSM for instance. And the camera 38 may function to capture digital images and to store the images in digital image files.

Processing unit 40 may then comprise one or more general purpose processors (e.g., microprocessors) and/or one or more special purpose processors (e.g., application specific integrated circuits). And data storage 42 may comprise one or more volatile and/or non-volatile storage components such as magnetic, optical, or flash storage. In practice, as shown, data storage 42 may hold user data 46 as well as program logic (e.g., program instructions) 48, such as an operating system and program applications, executable by the processing unit 40 to carry out various functions described herein. In particular, one such program application may be an application that causes the device to integrate image classification or "sifting" with lock-screen functionality as discussed above.

Phone 12 optimally includes and/or has access to one or more user-accessible storage folders that may hold user data including digital image files as noted above.

For example, the phone itself may include a file management function that defines in data storage 42 a hierarchical file-folder structure as a hierarchy of storage folders, allowing user data to be stored in particular folders, moved between folders, and otherwise managed, and allowing user access to some or all of the folders. In practice, the phone may record storage of a data file in a particular folder by physically storing the data file at a particular location in data storage 42 or more likely by storing the data file in one or more pieces within the data storage and storing an index or pointer that correlates the stored data file with the particular folder. Further, the file management function may provide a graphical user interface through which a user may browse through such folders and view or otherwise access the data files stored in various folders.

Furthermore, one or more such storage folders and associated file contents on the phone could be synchronized with corresponding storage folders and file contents on one or more other devices, through use of a data synchronization service. Thus, a user of the phone 12 may also make use of a personal computer or networked server that defines a hierarchical folder structure holding a digital image library, and that hierarchical folder structure and its digital image file contents could be synchronized with a copy of the folder structure and its digital image contents on the phone. With this arrangement, as changes are then made to the folder structure and/or file contents on the phone, the same changes may automatically occur to the folder structure and/or file contents on the computer or networked server. For instance, if the phone moves a digital image file from one folder to another in data storage 42, a copy of the digital image file on the computer or networked server may automatically be moved between corresponding folders there as well. Likewise, if the phone meta-tags a digital image file in data storage 42 with particular meta-data, a copy of the digital image file on the computer or networked server may automatically be updated to include the same meta-data.

As another example, the phone might have remote access to external data storage that includes one or more user-accessible folders holding digital image files. For instance, the phone may wirelessly communicate with another computing device or networked server, such as a social-networking server and/or a cloud storage server, and that other computing device or networked server may include data storage defining a hierarchical folder structure containing digital image files, with storage occurring in various ways as discussed above. Through that connection, the phone may then provide access to the remote folder structure and file contents and may thus retrieve digital image files, move digital image files between storage folders, and otherwise manage the digital image files. Further, the phone may likewise have a file management function that provides a graphical user interface through which a user may browse through such folders and view or otherwise access the data files stored in various folders.

In practice, each of the digital image files held by the one or more user-accessible storage folders may contain data representing a respective digital image, compressed and/or encoded in accordance with an image codec such as bmp, gif, jpeg, tiff, png, or others now known or later developed. Phone 12 may then be arranged to retrieve such a digital image file from a storage folder and to decompress and/or decode the image data and present the image on display 14. Furthermore, each digital image file may include embedded meta-data, such as Exchangeable Image File Format (Exif) data, that characterizes information about the underlying image, such as camera make/model and capture settings, compression protocol, dimensions, and the like. Such meta-data could serve to classify the image represented by the image file, so as to facilitate searching for or sorting images for instance.

As discussed above, the present method and apparatus provides a mechanism that enables a user to conveniently categorize potentially numerous digital images as part of the recurring process of the user unlocking a computing device such as phone 12. This mechanism could be added to existing phone 12 by downloading and installing on the phone an application that is executable by processing unit 40 to cause the phone to carry out the functions described herein. Alternatively, the mechanism could be provided as a core application or operating system feature of the phone without a need to separately download and install an application.

According to the method, when the phone transitions to a display-on state, or in response to another trigger, the phone may be in or enter into a locked state in which the phone presents a lock-screen interface that includes an image rendered from a digital image file. With the lock-screen interface thus displayed, the phone may then receive user input that integrally causes the phone not only to transition past the lock-screen interface into an unlocked state (though possibly then requiring user passcode entry) but also to classify the digital image file in accordance with the user input. For instance, in response to receiving user input classifying the displayed image as being in class X, the phone may not only transition from the locked state to the unlocked state but also (i) move the digital image file to a folder designated for holding digital image files of class X and/or (ii) meta-tag the digital image file with meta-data indicating that the image is a member of class X. In this manner, the user would thus conveniently achieve the goal of classifying the displayed image while unlocking the phone.

In a representative implementation, when the phone is displaying the image on its lock screen, the phone may be arranged to receive the user input in the form of a touch gesture on touch-sensitive display, with the gesture indicating a user desired classification of the displayed image. In particular, the lock-screen interface may be arranged to receive various possible gestures, with each gesture corresponding with a respective image classification and also functioning to trigger unlocking of the phone. Thus, when the phone is displaying the image on its lock screen, the phone may detect a particular one of the gestures on the display and, in response to detecting that particular gesture, both (i) transition past the lock screen and (ii) classify the underlying digital image file in accordance with the image classification corresponding with the detected gesture.

With this arrangement, for instance, one gesture that the user provides on the display could correspond with classification "X" of the image, and a different gesture that the user provides on the display could correspond with classification "Y" of the image. Thus, if the user provides the gesture corresponding with classification X, then the phone would not only transition past the lock screen but would also classify the underlying image file as being a member of classification X. Whereas, if the user provides the gesture corresponding with classification Y, then the phone would not only transition past the lock screen but would also classify the underlying image file as being a member of classification Y.

The act of classifying the underlying digital image file may take various forms. To begin with, the assumption is that the phone has a record of the digital image file from which the phone rendered the digital image displayed on the lock screen, including an indication of the folder or the like in which the digital image file is stored, whether that folder is on the phone itself or on another device with which the phone has connectivity. As one example of classifying the digital image file as being a member of a particular classification, the phone may move the digital image file from its current storage folder to a storage folder associated with the classification, such as a storage folder labeled with the classification for holding digital image files that are members of that classification. And as another example, the phone may meta-tag the digital image file with meta-data specifying the classification, such as by writing the classification to Exif meta-data of the digital image file for instance. Further, the phone may carry out both of these actions, and/or may carry out various other image classification actions.

Figure 5:
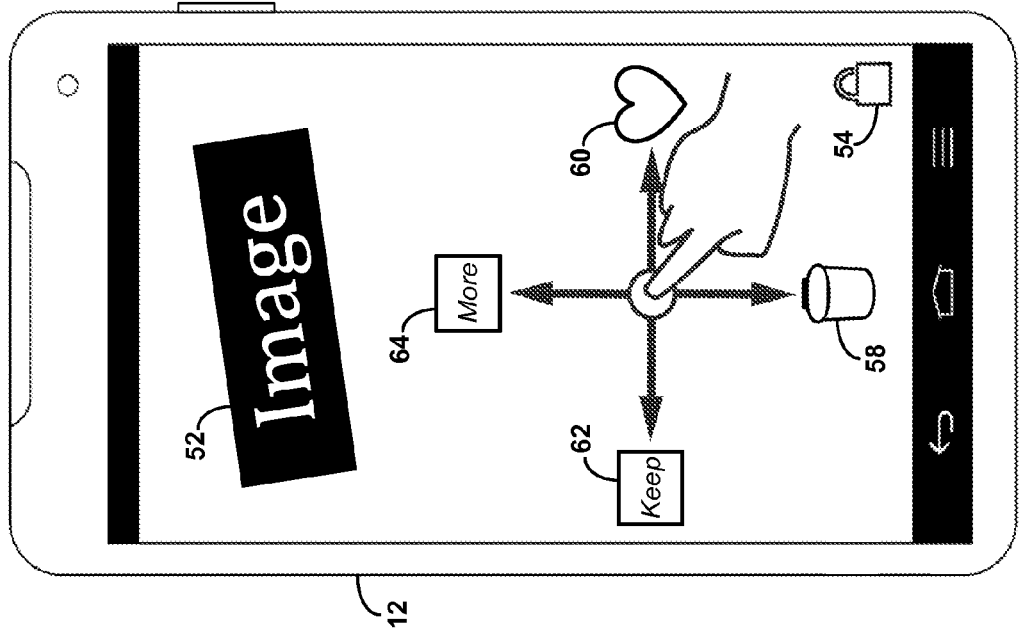
FIG. 5 is an illustration of the example lock-screen interface in a second state.
Figure 4:
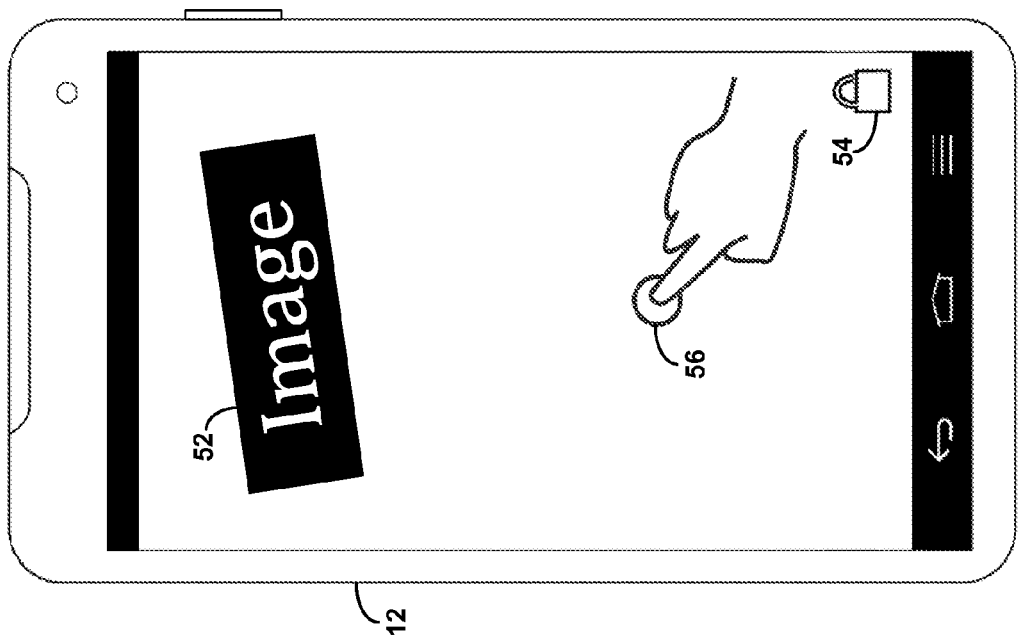
FIG. 4 is an illustration of an example lock-screen interface in a first state.

FIGS. 4 and 5 illustrate one example of how this integrated unlocking and image classification functionality could work in practice.

In the example process, when the phone transitions to a display-on state or in response to another trigger event, the phone will enter into a lock state and present on display 14 a lock-screen interface including an image rendered from a digital image file. For simplicity of illustration here, the label "Image" 52 is shown to represent presentation of an image as a background of the lock-screen interface. In practice, the actual image could occupy largely the entire background of the display area or could occupy just a portion of the display area. As further shown, the example lock-screen interface includes at its lower right corner a lock icon 54. In operation, the lock-screen interface may function to allow a user to drag that lock icon away from the lower right corner in order to unlock the phone without performing any image classification. However, in accordance with the present disclosure, the lock-screen interface further (or perhaps strictly) functions to allow image classification as part of the unlocking process.

As shown in FIG. 4, the example lock-screen interface presents a small dot 56, possibly overlaid on the displayed image. In the example implementation, this dot functions as a selection object, which a user can drag to indicate a desired image classification and simultaneously to unlock the phone. In particular, when the phone detects a touch on dot 56, the phone may then responsively present additional controls as part of the lock-screen interface, as shown in FIG. 5. As shown there, the additional controls include various objects positioned at different directions from dot 56. (The figure includes arrows extending out from dot 56 to these objects, to illustrate directions of the objects from the dot. These arrows may or may not be presented on the lock-screen interface itself) In practice, at least two of these objects may constitute image-classification objects each representing a different image classification. For instance, as shown, the object below the dot is a trash can icon 58 representing a "Trash" classification, and the object to the right of the dot is a heart icon 60 representing a "Favorites" classification. Numerous other examples of image-classification objects could be defined as well, corresponding with any of a variety of desired image classifications.

With the arrangement as shown in FIG. 5, the lock-screen interface allows for user input in the form of a gesture selected from at least two distinct gestures to achieve either of at least two distinct image classifications while concurrently unlocking the phone. If the user wishes to classify the displayed image as undesired or "Trash," the user may drag the dot icon to the trash can icon. In response to detecting this particular gesture, the phone would then both (i) transition from the locked state to the unlocked state and (ii) classify the underlying digital image file as being a member of the "Trash" classification—such as by moving the digital image file to a "Trash" folder and/or meta-tagging the digital image file with a "Trash" classification. Whereas, if the user wishes to classify the displayed image as a "Favorite," the user may drag the dot icon to the heart icon. In response to detecting this particular gesture instead, the phone would then both (i) transition from the locked state to the unlocked state and (ii) classify the underlying digital image file as being a member of the "Favorites" classification—such as by moving the digital image file to a "Favorites" folder and/or meta-tagging the digital image file with a "Favorites" classification.

As further shown in FIG. 5, the controls presented by the example lock-screen interface also include a "Keep" icon 62 and a "More" icon 64. In practice, user dragging of the dot icon to the "Keep" icon could cause the phone to maintain an existing classification of the underlying image file (e.g., keeping the underlying image file in its current storage folder) while unlocking the phone. Further, dragging the dot icon to the "More" icon could cause the phone to carry out one or more other functions while unlocking the phone.

In practice, the phone may also provide a user configuration interface through which a user can configure operation of the image-classification and unlocking functionality. Such a configuration interface may be arranged to let a user browse through folders and select a folder to be a source for images that will be used in the present process. To assist the user with this selection, the configuration interface may present to the user an indication of how many digital image files are contained in each of various folders. Thus, the user might select a folder containing many digital images for instance. Further, the configuration interface may be arranged to let a user define image-classifications, define corresponding folders (e.g., sub-folders) to which the phone should move digital image files classified in particular image-classifications, and perhaps specify custom image-classification objects and locations on the lock-screen interface corresponding with each image-classification, among other functions.

In operation, each time the phone presents the lock-screen interface, the phone may select a next digital image file from the folder designated as a source for digital images and may render the selected digital image file for presentation on the lock screen, allowing classification and unlocking as discussed above. In practice, for instance, the phone may randomly select one of the digital image files from the source folder and prepare the image for presentation in advance of presenting the lock-screen interface, so that the image will appear on the lock-screen interface as soon as the lock-screen interface is presented.

In the example implementation where the phone moves the lock screen image to a folder corresponding with the user-designated classification, carrying out this process repeatedly each time the phone presents the lock-screen interface may ultimately result in exhausting the supply of digital image files in the source folder. At that point, the phone may be arranged to present on the lock screen a notice to the user informing the user that the user has successfully classified all of the images in the designated source folder, and inviting the user to go to the configuration interface to select a new source folder.

Figure 6:
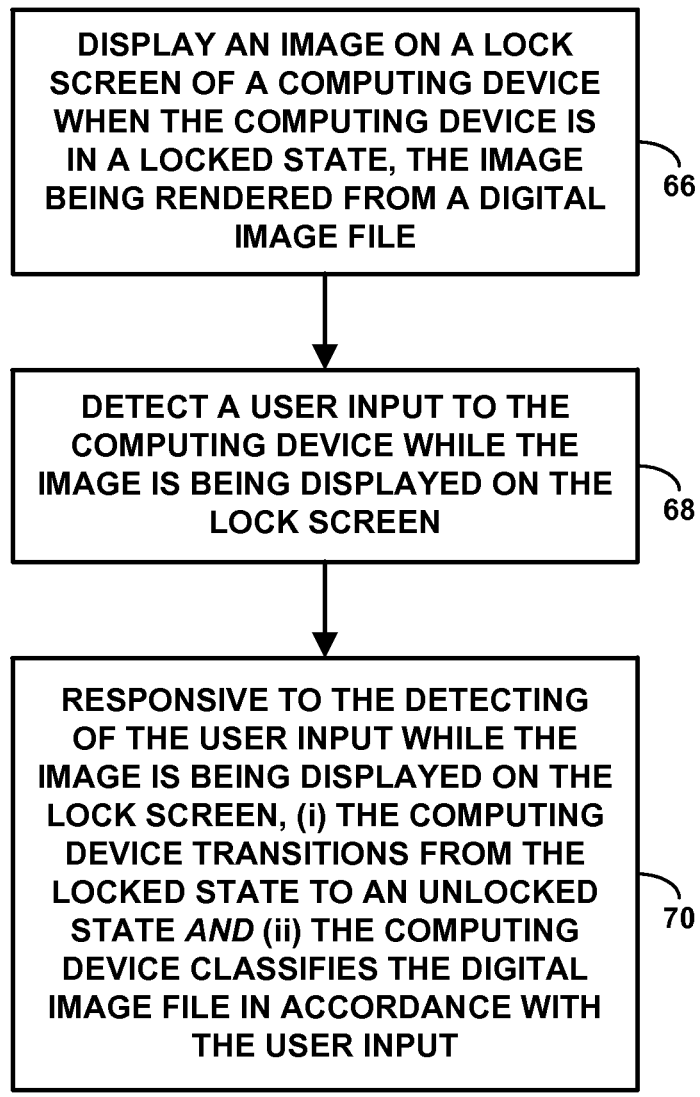
FIG. 6 is a flow chart depicting functions that can be carried out in accordance with the present method.

FIG. 6 is next a flow chart depicting functions that can be carried out in accordance with an example implementation of the present method. As shown in FIG. 6, at block 66, the example method involves displaying an image on a lock screen of a computing device when the computing device is in a locked state, the image being rendered from a digital image file. At block 68, the method then involves the computing device detecting a user input to the computing device while the image is being displayed on the lock screen. And at block 70, the method involves, responsive to the detecting of the user input while the image is being displayed on the lock screen, (i) the computing device transitioning from the locked state to an unlocked state and (ii) the computing device classifying the digital image file in accordance with the user input.

As discussed above, the displaying in this method may be responsive to the computing device transitioning from a display-off state to a display-on state. Further, the digital image file from which the image is rendered may be stored in a first user-accessible folder, and the act of classifying the digital image file in accordance with the user input may involve moving the digital image file to a second user-accessible folder corresponding with the user input, such as to a sub-folder of the first user-accessible folder for instance. In practice, the first user-accessible folder and the second user-accessible folder may both be defined in data storage of the computing device. Alternatively, at least one of those folders may be defined in data storage external to the computing device.

Alternatively or additionally, as discussed above, the act of classifying the digital image file in accordance with the user input may involve meta-tagging the digital image file with meta-data defining a classification of the digital image file corresponding with the user input.

In line with the discussion above, the computing device may have a touch-sensitive display, in which case displaying the image on the lock screen may involve displaying the lock screen on the touch-sensitive display and including the image as part of the displayed lock screen, with the user input then being a gesture on the touch-sensitive display. Further, in that implementation, the method may involve the computing device determining, based on which of multiple gestures the gesture is, a classification for the digital image file, in which case the act of classifying the digital image file in accordance with the user input may involve classifying the digital image file in accordance with the determined classification.

By way of example, as discussed above, the gesture may involve dragging a selection object on the lock screen to one of multiple different image-classification objects on the lock screen, each image-classification object corresponding with a respective classification, in which case the act of determining the classification based on which of multiple gestures the gesture is may involve determining the classification based on which image-classification object the selection object is dragged to. Further, one such image-classification object could be a favorites object corresponding with a favorites classification, and another such image-classification object could be a trash object corresponding with a trash classification.

Yet further, in line with the discussion above, the digital image file from which the image is rendered may be stored in a user-accessible folder, and the method may involve the computing device receiving a configuration input including a designation of the user-accessible folder as a source for lock-screen image display. In that case, the act of displaying the image on the lock screen of the computing device when the computing device is in the locked state may be based on the received designation of the first user-accessible folder as the source for lock-screen image display, as the computing device may select the underlying digital image file from that source folder.

Additionally in line with the discussion above, a computing device that carries out the present method may include a touch-sensitive display and user-accessible data storage, and may have a display-off state in which the touch-sensitive display is powered off and a display-on state in which the touch-sensitive display is powered on. When the computing device then transitions from the display-off state to the display-on state, the computing device may enter into a locked state in which the computing device presents on the touch-sensitive display a lock-screen interface that includes an image rendered by the computing device from a digital image file selected from a plurality of digital image files. And while the lock-screen interface is thereby being presented, the computing device may detect at the touch-sensitive display a gesture input indicating a classification of the image and, in response to the gesture input, the computing device may (i) transition from the locked state to an unlocked state and (ii) move the selected digital image file to a storage location corresponding with the indicated classification of the image.

Such a computing device may further include user-accessible data storage (e.g., with a file management system allowing user access) for holding the plurality of digital image files, in which case the selected digital image file may be stored in a first folder of the user-accessible data storage, and the act of moving the selected digital image file to the storage location may involve moving the selected digital image file from the first folder to a second, different folder of the user-accessible data storage, such as to a sub-folder of the first folder for instance.

Further, each time the computing device presents the lock-screen interface, the computing device may include in the lock-screen interface a next image rendered by the computing device from a next digital image file selected from the plurality of digital image files, the computing device may detect at the touch-sensitive display a next gesture input indicating a classification of the next image, and, in response to the next gesture input, the computing device may (i) transition from the locked state to the unlocked state and (ii) move the selected next digital image file to a storage location corresponding with the indicated classification of the next image.

Finally, as noted above, features of the present method can be provided by an application that could be installed on and executed by a computing device. In particular, a non-transitory computer readable medium, such as a magnetic, optical, or flash storage medium, may have stored thereon program instructions executable by a processing unit to cause a computing device to carry out functions such as those described above. For instance, the functions may include (a) displaying an image on a lock screen of the computing device when the computing device is in a locked state, the image being rendered from a digital image file, (b) detecting a user input to the computing device while the image is being displayed on the lock screen, and (c) responsive to the detecting of the user input while the image is being displayed on the lock screen, (i) transitioning the computing device from the locked state to an unlocked state and (ii) classifying the digital image file in accordance with the user input.

Exemplary embodiments have been described above. Those skilled in the art will understand, however, that changes and modifications may be made to these embodiments without departing from the true scope and spirit of the invention.

What is claimed is:

1. A method comprising:
   displaying an image on a lock screen of a computing device when the computing device is in a locked state, wherein the image is rendered from a digital image file;
   detecting, by the computing device, a user input to the computing device while the image is being displayed on the lock screen; and
   responsive to the detecting of the user input while the image is being displayed on the lock screen, (i) transitioning, by the computing device, from the locked state to an unlocked state and (ii) classifying, by the computing device, the digital image file in accordance with the user input,
   wherein classifying the digital image file in accordance with the user input comprises an action selected from the group consisting of (a) meta-tagging the digital image file with meta-data defining a classification of the digital image file corresponding with the user input, wherein meta-tagging the digital image file with the meta-data comprises writing the meta-data to embedded Exchangeable Image File Format meta-data of the image file and (b) moving the digital image file to a user-accessible folder corresponding with the user input.

2. The method of claim 1, wherein the displaying is responsive to the computing device transitioning from a display-off state to a display-on state.

3. The method of claim 1, wherein the digital image file from which the image is rendered is stored in a first user-accessible folder, and wherein classifying the digital image file in accordance with the user input comprises moving the digital image file to a second user-accessible folder corresponding with the user input.

4. The method of claim 3, wherein the second user-accessible folder is a sub-folder of the first user-accessible folder.

5. The method of claim 3, wherein the first user-accessible folder and the second user-accessible folder are both defined in data storage of the computing device.

6. The method of claim 3, wherein at least one of the first user-accessible folder and the second user-accessible folder is defined in data storage external to the computing device.

7. The method of claim 1, wherein classifying the digital image file in accordance with the user input comprises meta-tagging the digital image file with the meta-data defining the classification of the digital image file corresponding with the user input.

8. The method of claim 1, wherein the computing device comprises a touch-sensitive display, wherein displaying the image on the lock screen comprises displaying the lock screen on the touch-sensitive display and including the image as part of the displayed lock screen, and wherein the user input is a gesture on the touch-sensitive display.

9. The method of claim 8, further comprising determining by the computing device, based on which of multiple gestures the gesture is, a classification for the digital image file, wherein classifying the digital image file in accordance with the user input comprises classifying the digital image file in accordance with the determined classification.

10. The method of claim 9, wherein the gesture comprises dragging a selection object on the lock screen to one of multiple different image-classification objects on the lock screen, each image-classification object corresponding with a respective classification, wherein determining the classification based on which of multiple gestures the gesture is comprises determining the classification based on which image-classification object the selection object is dragged to.

11. The method of claim 10, wherein a first one of the image-classification objects is a favorites object corresponding with a favorites classification, and a second one of the image-classification objects is a trash object corresponding with a trash classification.

12. The method of claim 1, wherein the digital image file from which the image is rendered is stored in a user-accessible folder, wherein the method further comprises receiving into the computing device a configuration input including a designation of the user-accessible folder as a source for lock-screen image display, and wherein displaying the image on the lock screen of the computing device when the computing device is in the locked state is based on the received designation of the first user-accessible folder as the source for lock-screen image display.

13. A computing device comprising a touch-sensitive display and user-accessible data storage, wherein the computing device has a display-off state in which the touch-sensitive display is powered off and a display-on state in which the touch-sensitive display is powered on,
   wherein, when the computing device transitions from the display-off state to the display-on state, the computing device enters into a locked state in which the computing device presents on the touch-sensitive display a lock-screen interface that includes an image rendered by the computing device from a digital image file selected from a plurality of digital image files, and
   wherein, while the lock-screen interface is thereby being presented, the computing device detects at the touch-sensitive display a gesture input indicating a classification of the image and, in response to the gesture input, the computing device (i) transitions from the locked state to an unlocked state and (ii) moves the selected digital image file to a storage location corresponding with the indicated classification of the image.

14. The computing device of claim 13, further comprising user-accessible data storage for holding the plurality of digital image files, wherein the selected digital image file is stored in a first folder of the user-accessible data storage, and wherein moving the selected digital image file to the storage location comprises moving the selected digital image file from the first folder to a second, different folder of the user-accessible data storage.

15. The computing device of claim 14, wherein the second folder is a sub-folder of the first folder.

16. The computing device of claim 13, wherein each time the computing device presents the lock-screen interface:
   the computing device includes in the lock-screen interface a next image rendered by the computing device from a next digital image file selected from the plurality of digital image files,
   the computing device detects at the touch-sensitive display a next gesture input indicating a classification of the next image, and
   in response to the next gesture input, the computing device (i) transitions from the locked state to the unlocked state and (ii) moves the selected next digital image file to a storage location corresponding with the indicated classification of the next image.

17. A non-transitory computer readable medium having stored thereon program instructions executable by a processing unit to cause a computing device to carry out functions comprising:

displaying an image on a lock screen of the computing device when the computing device is in a locked state, wherein the image is rendered from a digital image file;

detecting a user input to the computing device while the image is being displayed on the lock screen; and responsive to the detecting of the user input while the image is being displayed on the lock screen, (i) transitioning the computing device from the locked state to an unlocked state and (ii) classifying the digital image file in accordance with the user input, wherein classifying the digital image file in accordance with the user input comprises an action selected from the group consisting of (a) meta-tagging the digital image file with meta-data defining a classification of the digital image file corresponding with the user input, wherein meta-tagging the digital image file with the meta-data comprises writing the meta-data to embedded Exchangeable Image File Format meta-data of the image file and (b) moving the digital image file to a user-accessible folder corresponding with the user input.

18. The non-transitory computer readable medium of claim 17, wherein the digital image file from which the image is rendered is stored in a first user-accessible folder, and wherein classifying the digital image file in accordance with the user input comprises moving the digital image file to a second user-accessible folder corresponding with the user input.

19. The non-transitory computer readable medium of claim 17, wherein classifying the digital image file in accordance with the user input comprises meta-tagging the digital image file with meta-data defining a classification of the digital image file corresponding with the user input.

20. The non-transitory computer readable medium of claim 17, wherein the computing device comprises a touch-sensitive display, wherein displaying the image on the lock screen comprises displaying the lock screen on the touch-sensitive display and including the image as part of the displayed lock screen, wherein the user input is a gesture on the touch-sensitive display, and wherein the functions further comprise:

determining, based on which of multiple gestures the gesture is, a classification for the digital image file, wherein classifying the digital image file in accordance with the user input comprises classifying the digital image file in accordance with the determined classification.

\* \* \* \* \*